(12) United States Patent
Wegelin et al.

(10) Patent No.: US 10,655,967 B2
(45) Date of Patent: May 19, 2020

(54) MARKER PLACEMENT WITHIN A MAP INTERFACE

(71) Applicant: GOJO Industries, Inc., Akron, OH (US)

(72) Inventors: Jackson William Wegelin, Stow, OH (US); Patrick O'Keefe, Jr., Wellington, OH (US); Andrew Moore, Wakeman, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 15/540,305

(22) PCT Filed: Jan. 14, 2016

(86) PCT No.: PCT/US2016/013348
§ 371 (c)(1),
(2) Date: Jun. 28, 2017

(87) PCT Pub. No.: WO2016/115309
PCT Pub. Date: Jul. 21, 2016

(65) Prior Publication Data
US 2018/0003510 A1    Jan. 4, 2018

Related U.S. Application Data

(60) Provisional application No. 62/103,219, filed on Jan. 14, 2015.

(51) Int. Cl.
*G01C 21/20*   (2006.01)
*G09B 29/10*   (2006.01)

(52) U.S. Cl.
CPC ......... *G01C 21/206* (2013.01); *G09B 29/106* (2013.01)

(58) Field of Classification Search
CPC combination set(s) only.
See application file for complete search history.

(56) References Cited

U.S. PATENT DOCUMENTS

| 4,920,488 A * | 4/1990 | Filley | G06Q 10/087 235/385 |
| 6,882,278 B2 * | 4/2005 | Winings | G08B 21/245 340/573.1 |

(Continued)

OTHER PUBLICATIONS

International Search Report cited in PCT Application No. PCT/US2016/013348 dated Jul. 1, 2016, pp. 1-18.

(Continued)

*Primary Examiner* — Adam D Tissot
*Assistant Examiner* — Edward J Pipala
(74) *Attorney, Agent, or Firm* — Cooper Legal Group, LLC

(57) ABSTRACT

One or more techniques and/or systems are provided for hygiene device marker placement on a map interface, indoor locator system installation, and/or hygiene installation plan creation for hygiene devices. In an example, a map interface may be displayed on a client device of a user. The user may place and/or reposition hygiene device markers (e.g., a representation of a sanitizer dispenser within a department store building), locator beacon markers (e.g., a representation of a Bluetooth locator beacon marker of an indoor locator system installation for the department store building), and/or hygiene installation markers (e.g., a representation of a soap dispenser that is to be installed within the department store building) within the map interface (e.g., a depiction of the department store building). A marker may be repositioned within the map interface to an adjusted position that may be used to update GPS coordinates used to initially position the marker.

20 Claims, 16 Drawing Sheets

(56) References Cited

U.S. PATENT DOCUMENTS

| | | | |
|---|---|---|---|
| 7,855,651 B2* | 12/2010 | LeBlond | G06Q 10/06398 340/573.1 |
| 2010/0134296 A1* | 6/2010 | Hwang | A47K 5/1217 340/573.1 |
| 2011/0112754 A1 | 5/2011 | Reed et al. | |
| 2012/0173274 A1* | 7/2012 | Rensvold | G16H 40/20 705/2 |
| 2016/0321909 A1* | 11/2016 | Li | G01S 5/02 |

OTHER PUBLICATIONS

Anonymous: 11 Defibrillator Map-Android Apps on Google Play 11, Dec. 22, 2013 (Dec. 22, 2013), XP055263997, Retrieved from the Internet: URL: https:jjplay.google.comjstorejappsjdetails?id=com.www.irishdefib.ie.aedmaplive&hl=en&rdid=com.www.irishdefib.ie.aedmaplive [retrieved on Apr. 8, 2016] the whole document.

* cited by examiner

MARKER PLACEMENT WITHIN A MAP INTERFACE

RELATED APPLICATIONS

This application claims priority to U.S. Provisional Application 62/103,219, titled "MARKER PLACEMENT WITHIN A MAP INTERFACE" and filed on Jan. 14, 2015, which is incorporated herein by reference.

TECHNICAL FIELD

The instant application is generally directed towards systems and techniques for hygiene device marker placement, indoor locator system installation, and/or hygiene installation plan creation. In particular, hygiene device markers representing hygiene devices, hygiene installation markers representing locations at which hygiene devices are to be installed, and/or locator beacon markers used to track objects may be placed and/or repositioned within a map interface for hygiene device tracking, hygiene device installation, and/or locator system calibration.

BACKGROUND

Many locations, such as hospitals, factories, restaurants, homes, etc., utilize devices for hygiene, such as dispensers to dispense material, touch free faucets for sinks, an air freshener, a paper towel dispenser, flush valves for toilets, hygiene opportunity measurement devices (e.g., a people counter that identifies a number of hygiene opportunities based upon a count of people such as a number of people entering a bathroom; a zone sensor that identifies a hygiene opportunity based upon an identification of a person within a zone such as a nurse come within a proximity of a patient's bed, etc.), etc. For example, a dispenser may dispense a liquid material, powder material, aerosol material, and/or other materials (e.g., soap, anti-bacterial gels, cleansers, disinfectants, lotions, etc.). Some dispensers utilize a refill container for ease of maintenance, environmental concerns, etc. The refill container may, for example, comprise a pump and/or nozzle mechanism that can be used by a dispenser to dispense material from the refill container. Such hygiene devices may utilize power, such as a battery or an AC adapter, for operation.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for hygiene device marker placement on a map interface, indoor locator system installation, and/or hygiene installation plan creation for hygiene devices are provided herein. In an example of hygiene device marker placement, a map interface may be displayed to a user (e.g., a depiction of a hospital building). Responsive to receiving an initiate marker creation command, a create marker interface may be displayed. The create marker interface may comprising a hygiene device type specification interface (e.g., a text entry box, a drop down selection box, or any other interface for specifying a hygiene device type, such as a model of a soap dispenser, a paper towel dispenser, a flush valve, a hygiene opportunity measurement device such as a people counter or a zone sensor, or any other item used for sanitary purposes or for use within a bathroom). A create marker command may be received through the create marker interface (e.g., the user may issue a command to place a soap dispenser marker onto the depiction of the hospital building). A hygiene device marker may be placed on the map interface at an initial position. The hygiene device marker may represent a hygiene device, such as the soap dispenser located within the hospital building. Responsive to receiving a reposition command for the hygiene device marker (e.g., the user may drag and drop the hygiene device marker within the map interface), the hygiene device marker may be moved from the initial position to an adjusted position. In an example where the initial position is determined based upon initial global positioning system (GPS) information of a user device (e.g., a tablet used by the user to access the map interface) that may be relatively inaccurate because the user device may be located inside the hospital building, the initial GPS information may be updated based upon the adjusted position to create updated GPS information that may be relatively more accurate than the initial GPS information (e.g., the user may drag and drop the hygiene device marker to a relatively more accurate position corresponding to coordinates of a physical location of the hygiene device within the hospital building).

In an example of indoor locator system installation, a map interface may be displayed to a user (e.g., a map of a high school). Responsive to receiving a place locator beacon command, a locator beacon marker may be placed on the map interface at an initial position (e.g., the locator beacon marker may represent a Bluetooth locator beacon or any other locating functionality component that may be placed around the high school for location tracking of objects). Responsive to receiving a reposition command for the locator beacon marker, the locator beacon marker may be moved from the initial position to an adjusted position (e.g., the user may drag and drop the locator beacon marker from a north wall of a high school gymnasium to an eastern wall of the high school gymnasium, which may represent relatively more accurate coordinates of a physical location of the locator beacon). In this way, the user may place and/or reposition locator beacon markers on the map interface at relatively accurate positions corresponding to physical locations of locator beacon markers. An indoor locator system may be calibrated based upon adjusted positions of locator beacon markers (e.g., and/or initial positions of locator beacon markers that are not repositioned by the user) for improved accuracy of the indoor locator system.

In an example of creating a hygiene installation plan for hygiene devices, an installation plan component may be configured to display a map interface to a user. An indoor facility map interface, of an indoor facility, populated within the map interface may be identified (e.g., a hospital hygiene compliance planner may utilize the map interface to place hygiene installation markers within a hospital building map of a hospital so that a hygiene device installer may utilize the hygiene installation markers for guidance when installing corresponding hygiene devices within the hospital). Initial placement and repositioning of hygiene installation markers on the indoor facility map interface by the user may be facilitated (e.g., the hospital hygiene compliance planner may drag and drop hygiene installation markers onto the hospital building map). A hygiene installation plan for installing hygiene devices within the indoor facility may be created based upon the hygiene installation markers. The hygiene installation plan, comprising the indoor facility map interface populated with hygiene installation markers, may be displayed to the hygiene device installer.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
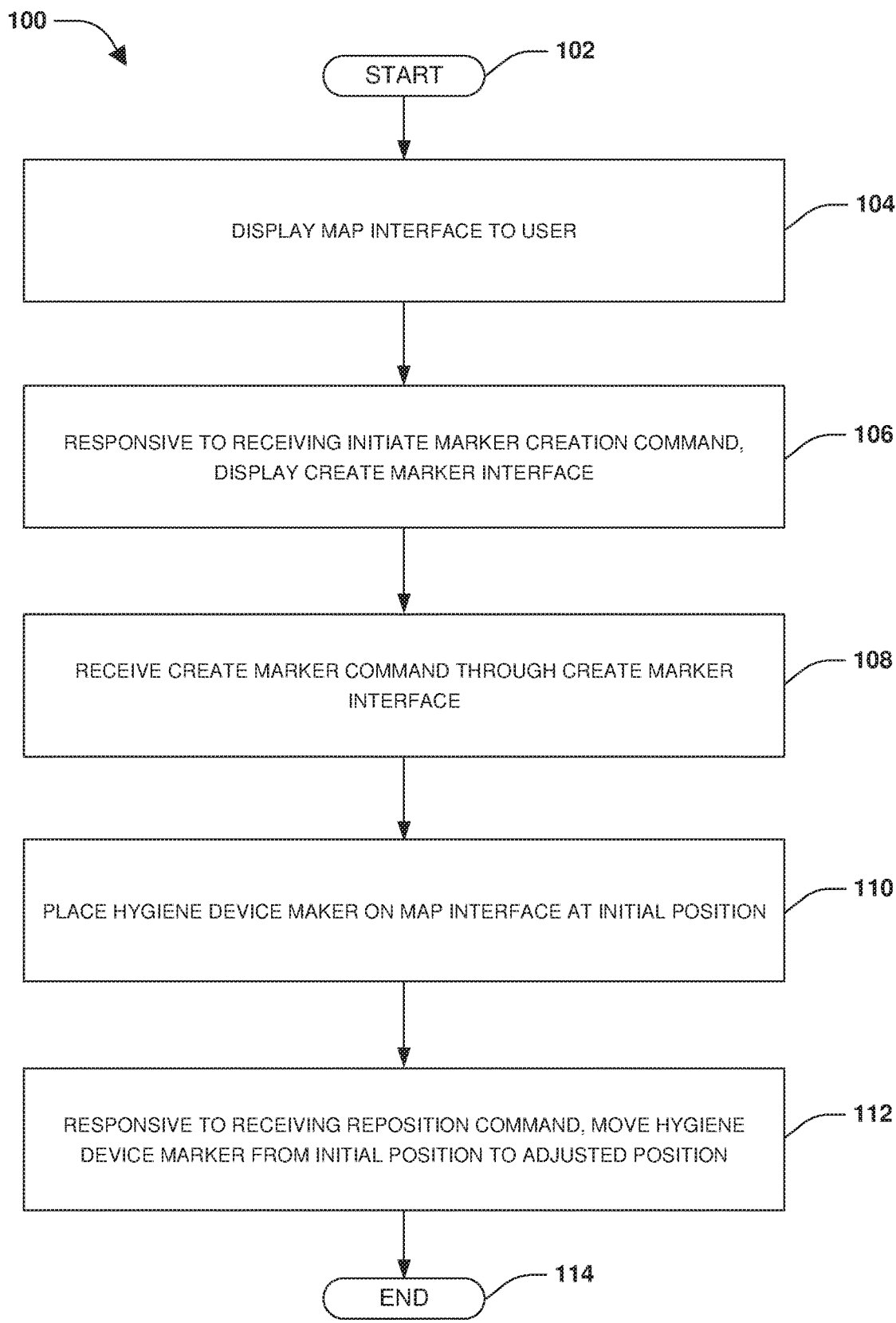
FIG. 1 is a flow diagram illustrating an example method of hygiene device marker placement on a map interface.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of hygiene device marker placement on a map interface is illustrated by an exemplary method 100 of FIG. 1. At 102, the method starts. At 104, a map interface may be displayed to a user. For example, a map content provider may display the map interface (e.g., an interactive global map depicting a region such as a country, a city, a neighborhood, etc.) through a user device, such as a smart phone, a tablet, or any other computing device. The user may zoom in/out, pan around, and/or move around the map interface, such as a downtown location depicted by the map interface. At 106, responsive to receiving an initiate marker creation command (e.g., a gesture command such as a touch gesture on the map interface, a voice command "initial marker creation at my current location", a click command on the map interface, a map selection command such as a selection of a building or other map object, a drag and drop command of a device marker element from a device marker interface onto the map interface, etc.), a create marker interface may be displayed. The create marker interface may comprise a hygiene device type specification interface through which the user may specify a type of hygiene device marker to place onto the map interface, such as a particular model of a paper towel dispenser, a soap dispenser, a sanitizer dispenser, an air freshener, a flush valve, etc. (e.g., the user may select a hygiene device type from a prepopulated list; the user may input a name for the hygiene device marker through a text entry box; the user may select the hygiene device type from a list of hygiene device icons; etc.). The create marker interface may comprise a location name specification interface (e.g., the user may label a location of a hygiene device that is to be represented by the hygiene device marker, such as "surgical room"), a building floor designation interface (e.g., the user may place hygiene device markers on various floors of a building), and/or other interfaces (e.g., a comment interface through which the user may input comments such as "this dispenser appears to be empty, broken, has a low battery, has been tampered with, etc.").

At 108, a create marker command may be received through the create marker interface (e.g., the user may select to place a Model X soap dispenser marker onto the map interface; the user may drag and drop a Model X soap dispenser marker element from the device marker interface onto the map interface; etc.). At 110, a hygiene device marker may be placed on the map interface at an initial position. The hygiene device marker may represent a hygiene device (e.g., the Model X soap dispenser marker may represent a Model X soap dispenser). In an example, the hygiene marker may be placed within an indoor facility map interface populated within the map interface (e.g., the hygiene marker may be placed within a second floor of a hospital building map corresponding to a 1-to-1 map ratio or any other map ratio with a hospital building). In an example, an entry may be created within a hygiene device tracking database. The entry may correlate a hygiene device, represented by the hygiene device marker, with coordinates of the initial position and a hygiene device type of the hygiene device (e.g., the entry may specify that the Model X soap dispenser is located at particular coordinates within a surgical room of the hospital building). The coordinates within the entry may be adjusted based upon subsequent repositioning of the hygiene device marker by the user or other users (e.g., a second user may drag and drop the Model X soap dispenser marker from an eastern wall of the surgical room to a western wall of the surgical room).

In another example of creating a hygiene device marker, a user may select (e.g., a finger tap, a mouse click, etc.) a position on the map interface. Responsive to the selection of the position, a hygiene device marker may be placed at the position. In this way, the user may easily add hygiene device markers at desired locations within the map interface. The user may slide the hygiene device marker around the map interface in order to reposition the hygiene device marker. Hygiene device makers may be positioned and/or repositioned utilizing longitude and latitude information provided by map interface metadata. The position of the hygiene device marker may be uploaded to a cloud database or other map feature storage location.

In an example, a share interface may be displayed for the hygiene device marker. Responsive to receiving a share command through the share interface, the hygiene device marker may be shared with a second user (e.g., the share interface may comprise an email address specification interface or a user account specification interface through which the user may specify identification information of the second user) and/or a map content provider that provides the map interface to client devices (e.g., the share interface may comprise an upload to cloud button). In an example, the hygiene device marker may be uploaded to the map content provider so that the hygiene device marker may be populated within map interfaces provided to other users. In another example, information, such as a hygiene device type, a model of the hygiene device, coordinates of the hygiene device, comments about the hygiene device, and/or other descriptive information derived from the hygiene device marker may be shared with the second user such as through an email. In another example, the hygiene device marker may be populated within a second map interface provided to the second user. In this way, hygiene device markers may be shared between users. Various commands may be performed for the hygiene device marker, such as repositioning the hygiene device marker, changing a hygiene device type of the hygiene device represented by the hygiene device marker, deleting the hygiene device marker based upon a delete command, changing a display property of the hygiene device marker (e.g., a color, a size, an icon, etc.), adding a textual description, a visual animation, and/or an audio description for the hygiene device marker that may be presented responsive to selection of the hygiene device marker, etc.

In an example, locational information of a user device hosting the map interface may be identified (e.g., GPS coordinates of a tablet device used to access the map interface populated with the hospital building map). The initial position for the hygiene device marker may be selected based upon the locational information (e.g., the GPS coordinates may indicate that the user is within the surgical room on the second floor of the hospital building). Unfortunately, the locational information may be relatively inaccurate such as when the tablet device is within the hospital building, and thus the locational information may be adjusted based upon the user repositioning the hygiene device marker to a relatively more accurate position corresponding to an actual physical location of the hygiene device. At 112, responsive to receiving a reposition command for the hygiene device marker (e.g., the user may drag and drop the Model X soap dispenser marker from the eastern wall of the surgical room to a hallway outside the surgical room), the hygiene device marker may be moved from the initial position to an adjusted position. For example, the Model X soap dispenser marker may have been initially positioned on the eastern wall based upon initial GPS information (e.g., GPS coordinates) of the user device. Because the initial GPS information may be relatively inaccurate and thus the initial position of the Model X soap dispenser marker on the eastern wall may be incorrect, the user may move the Model X soap dispenser marker to the hallway outside of the surgical room. The initial GPS information may be adjusted based upon the adjusted position of the hallway to create updated GPS information (e.g., GPS coordinates that are relatively more accurate to the actual physical location for the Model X soap dispenser).

The map interface, such as the hospital building map, may be provided by a map content provider to various users. In an example, a second user may attempt to authenticate with the map content provider, such as logging into an account that has access rights to view certain types of markers. Responsive to the second user successfully authenticating with the map content provider into a user account having permission to view the hygiene device marker, a visible attribute may be applied to the hygiene device marker so that the hygiene device marker is visible to the second user through a map interface. Responsive to the second user unsuccessful authenticating with the map content provider into a user account having permission to view the hygiene device marker, a hidden attribute may be applied to the hygiene device marker so that the hygiene device marker is not visible to the second user through a map interface.

Various information may be provided for the hygiene device through the hygiene device marker. For example, a service alert notification for the hygiene device may be provided through the hygiene device marker when the hygiene device marker is populated within a map interface displayed to a user (e.g., the hygiene device may communicate status information, such as the service alert notification, over a network to the map content provider for display as a textual or visual notification through the hygiene device marker). The service alert notification may indicate a battery status of the hygiene device, an amount of material remaining within a refill container installed within the hygiene device, an operational issue (e.g., a clogged pump, a stuck gear train, etc.), a type of refill container, an authenticity of the refill container, and/or a variety of other information. At 114, the method ends.

Figure 2A:
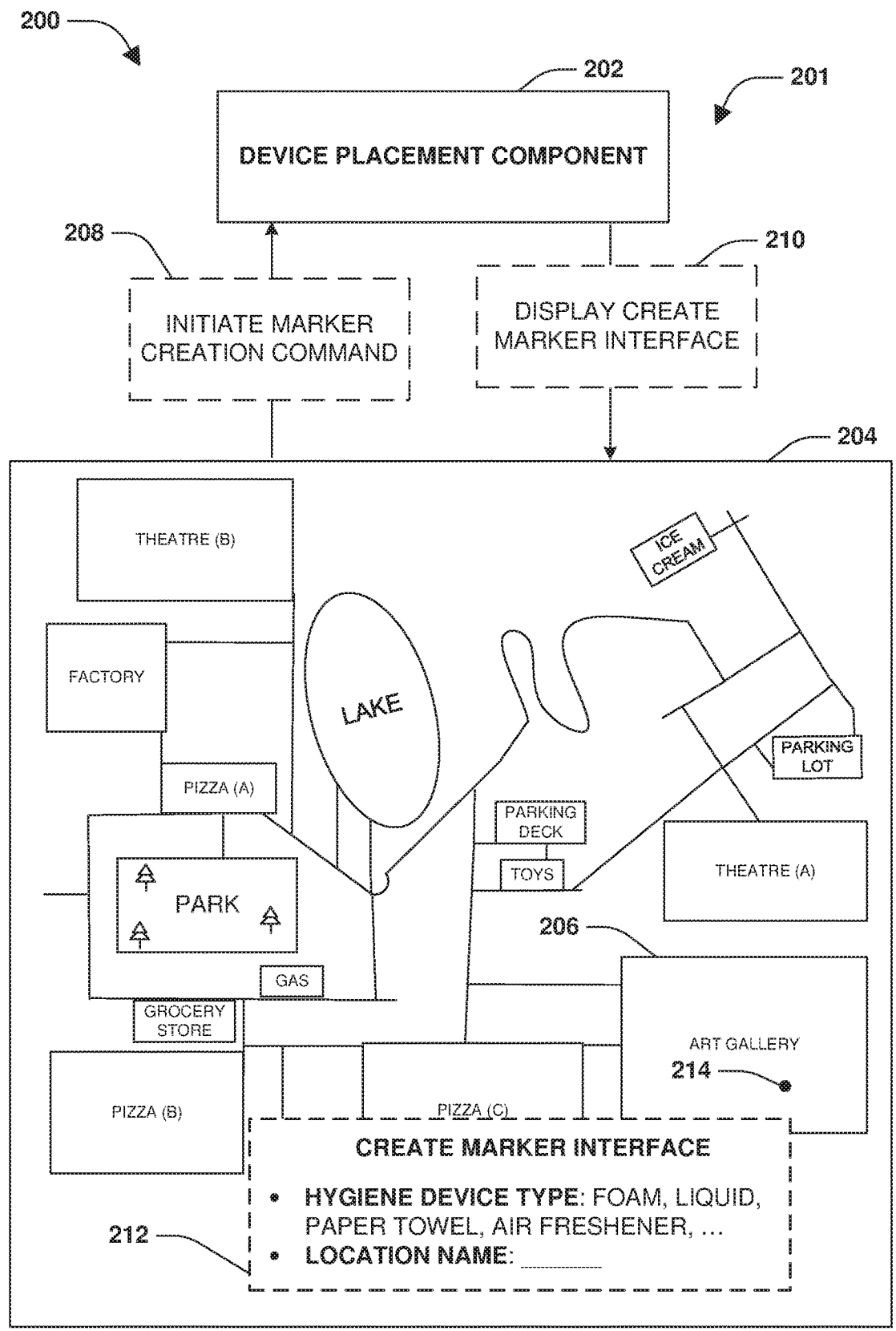
FIG. 2A is a component block diagram illustrating an example system for hygiene device marker placement on a map interface, where a create marker interface is displayed.
Figure 2B:
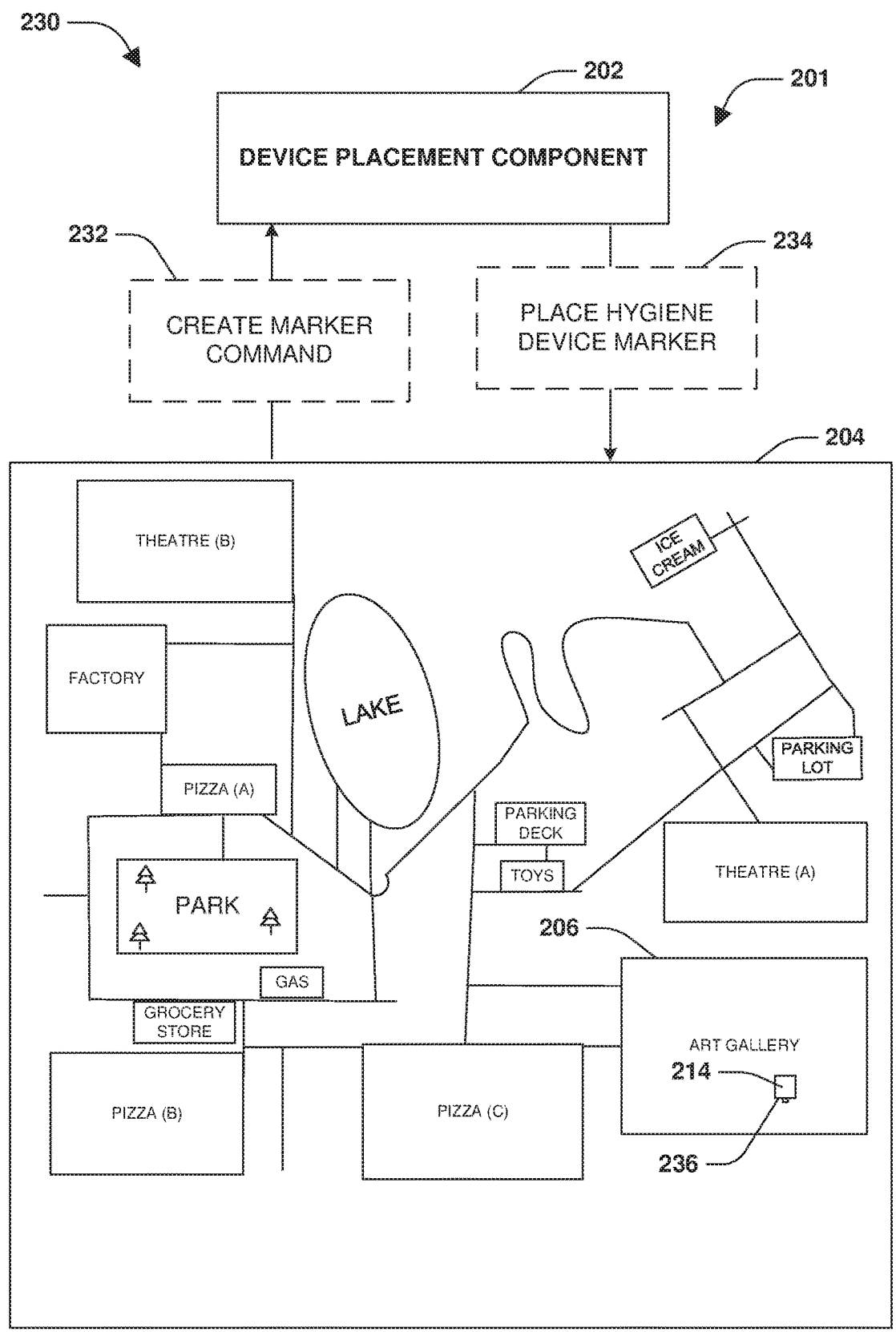
FIG. 2B is a component block diagram illustrating an example system for hygiene device marker placement on a map interface, where a hygiene device marker is placed on the map interface.
Figure 2C:
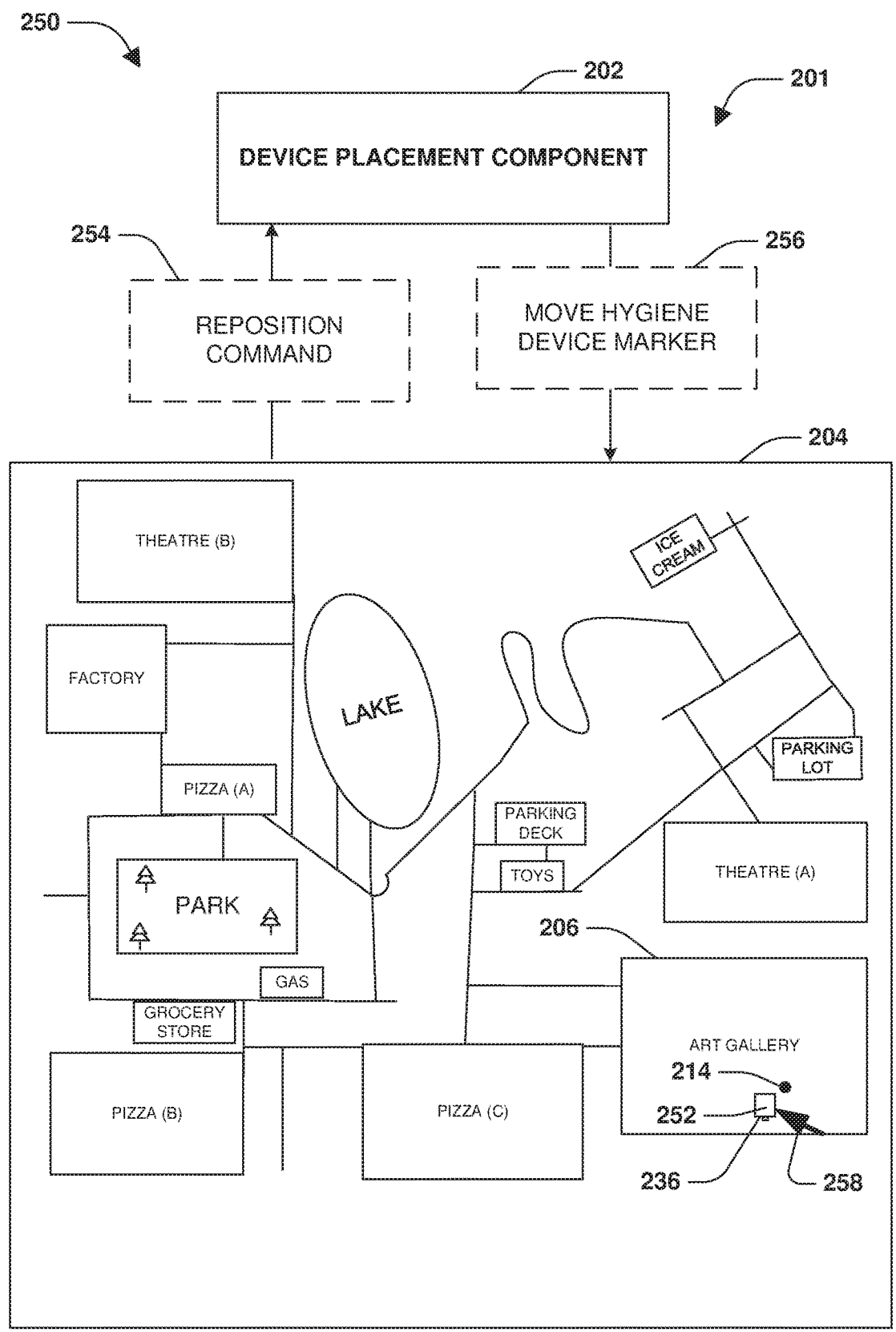
FIG. 2C is a component block diagram illustrating an example system for hygiene device marker placement on a map interface, where a hygiene device marker is repositioned within the map interface.

FIGS. 2A-2C illustrate examples of a system 201, comprising a device placement component 202, for hygiene device marker placement on a map interface 204. FIG. 2A illustrates an example 200 of the device placement component 202 displaying the map interface 204, depicting a neighborhood, to a user. The map interface 204 may depict a factory, a park, pizza shops, a theatre, an art gallery 206, and/or other locations within the neighborhood. The device placement component 202 may receive an initiate marker creation command 208 associated with the map interface 204. For example, the user may speak a command "I want to place a hygiene device marker at my current location" into a tablet through which the map interface 204 is displayed. The device placement component 202 may identify an initial position 214 within the art gallery 206 for hygiene device marker placement based upon initial GPS coordinates of the tablet. The device placement component 202 may display 210 a create marker interface 212 associated with the map interface 204. The create marker interface 212 may comprise a hygiene device type specification interface through which the user may select or specify a type of hygiene device that is to be represented by a hygiene device marker (e.g., a foam material dispenser, a liquid material dispenser, a paper towel dispenser, an air freshener, a particular model of a hygiene device, a type of hygiene opportunity measurement device, etc.), a location name specification interface through which the user may provide a textual name for the location at which a hygiene device marker may be placed, and/or other interfaces used to create hygiene device markers (e.g., a color or size specification interface, a building floor designation interface, a hygiene device marker icon upload interface through which the user may upload an icon to represent the hygiene device marker, a comment specification interface through which the user may provide comments about the hygiene device, etc.).

FIG. 2B illustrates an example 230 of the device placement component 202 receiving a create marker command 232 such as through the create marker interface 212. For example, the user may specify that a Model Y foam dispenser marker 236, representing a Model Y foam dispenser, is to be placed at a current location of the user, which the user labeled as "art gallery bathroom". The device placement component 202 may place 234 the Model Y foam dispenser marker 236 onto the map interface 204 at the initial position 214. Because the initial GPS coordinates of the tablet may be relatively inaccurate because the tablet may be located within the art gallery 206, the user may perform a reposition command 254 of the Model Y foam dispenser marker 236, as illustrated in example 250 of FIG. 2C. For example, the user may drag and drop the Model Y foam dispenser marker 236 from the initial position 214 to an adjusted position 252 utilizing a cursor 258, and thus the device placement component 202 may move 256 the Model Y foam dispenser marker 236 to the adjusted position 252 within the map interface 204. The initial GPS coordinates may be updated based upon the adjusted position 252 to create updated GPS coordinates that may be relatively more accurate than the initial GPS coordinates.

Figure 3A:
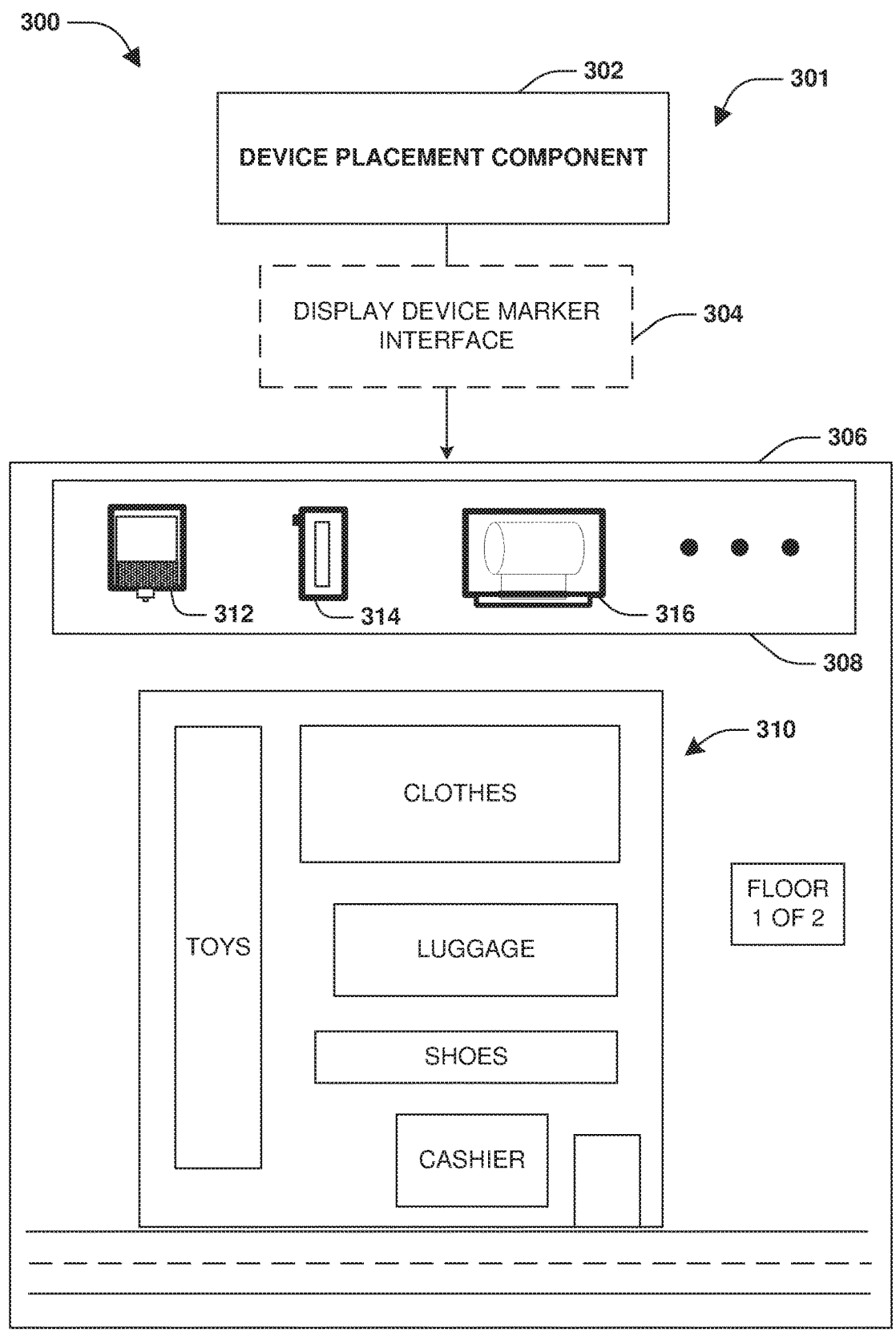
FIG. 3A is a component block diagram illustrating an example system for hygiene device marker placement on a map interface, where a device marker interface is displayed.
Figure 3B:
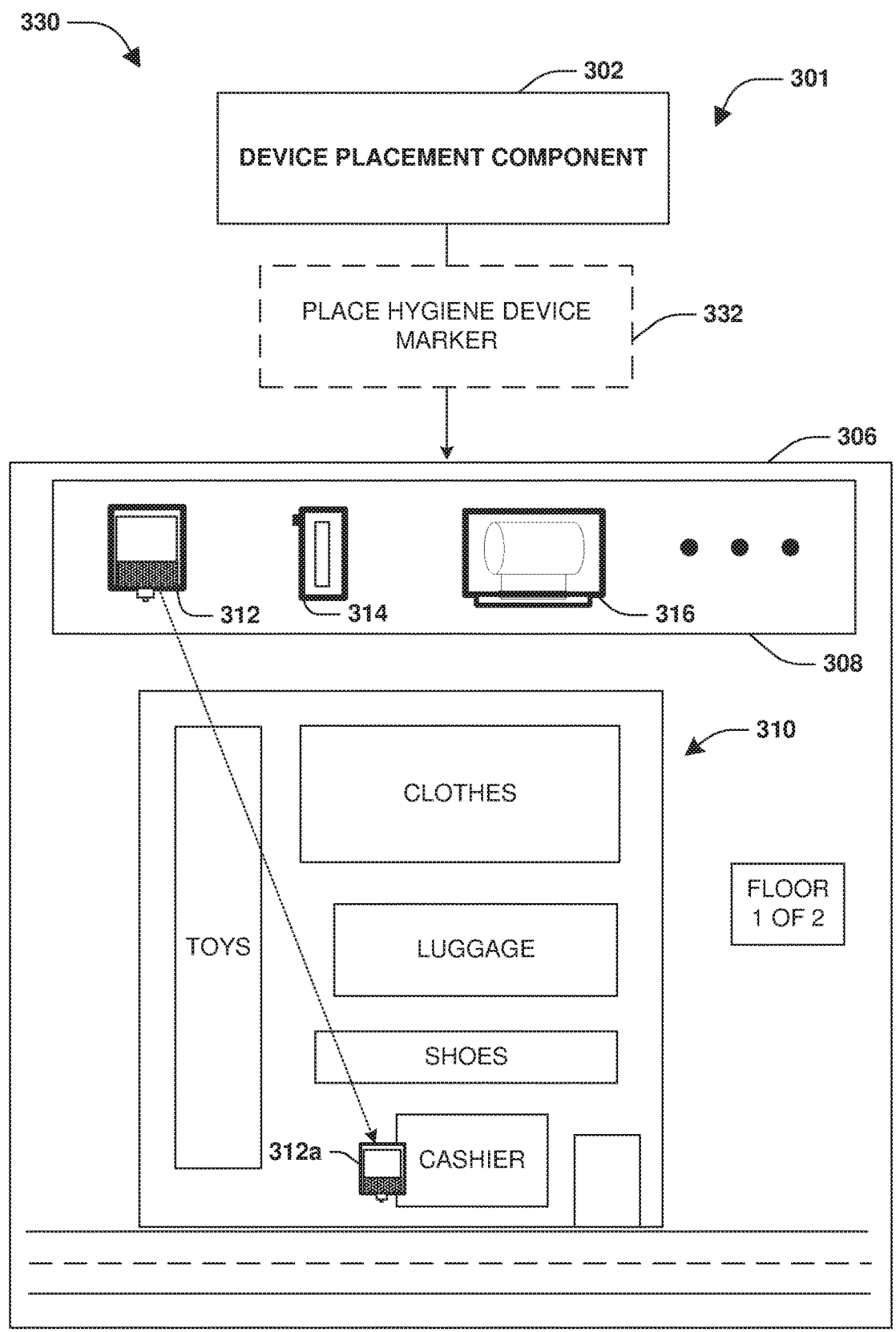
FIG. 3B is a component block diagram illustrating an example system for hygiene device marker placement on a map interface, where a hygiene device marker is placed on the map interface.
Figure 3C:
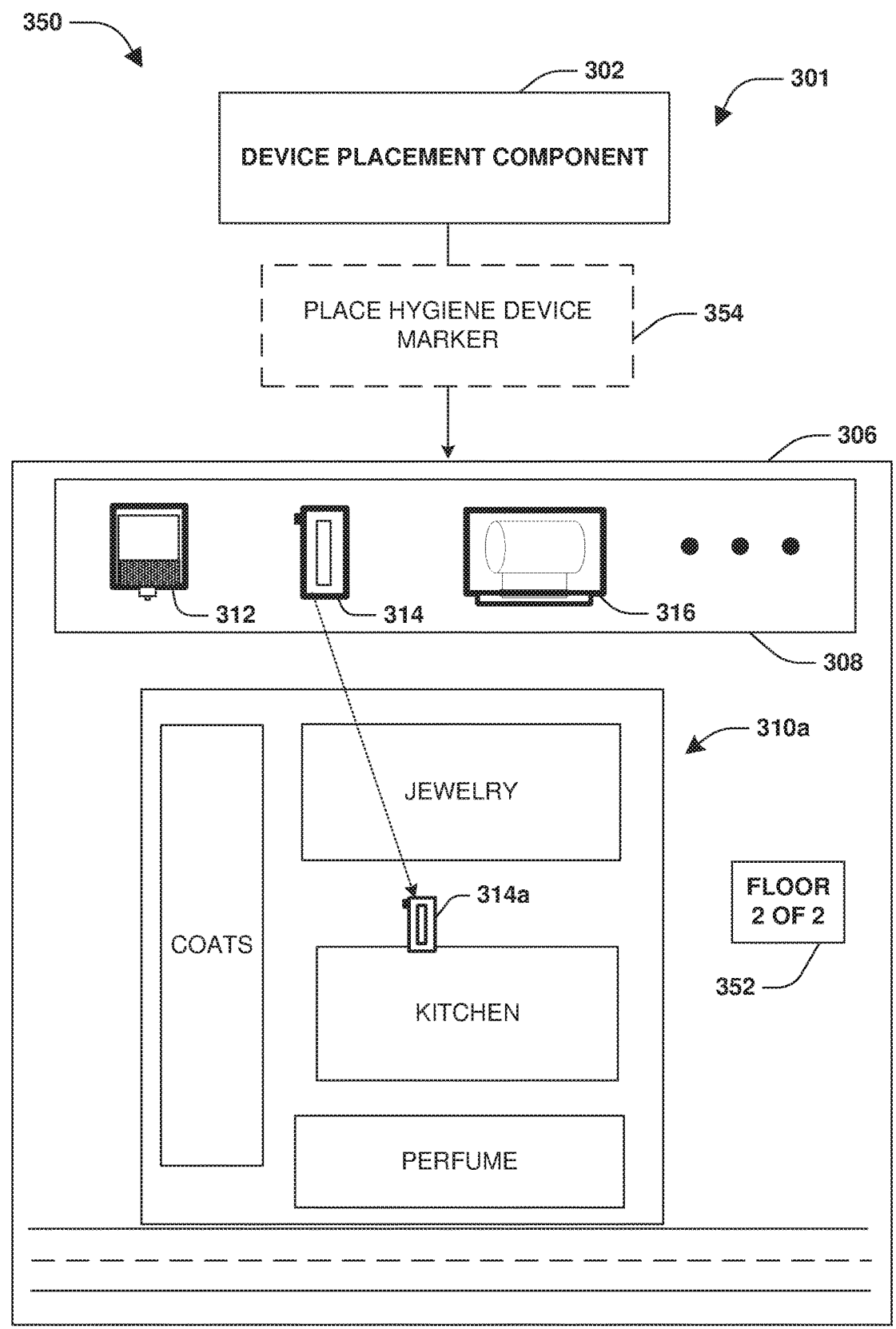
FIG. 3C is a component block diagram illustrating an example system for hygiene device marker placement on a map interface, where a hygiene device marker is placed on the map interface.

FIGS. 3A-3C illustrate examples of a system 301, comprising a device placement component 302, for hygiene device marker placement on a map interface 306. FIG. 3A illustrates an example 300 of the device placement component 302 displaying the map interface 306, comprising a department store indoor facility map interface 310 depicting one or more floors of a department store, to a user. The device placement component 302 may display 304 a device marker interface 308 populated with one or more device marker elements, such as a soap dispenser device marker element 312, an air freshener device marker element 314, a paper towel dispenser device marker element 316, etc. In an example, the user may drag and drop the soap dispenser device marker element 312 onto the department store indoor facility map interface 310 such that the device placement component 302 may place 332 a first soap dispenser device marker element 312a at an initial position corresponding to a first floor cashier section of the department store, as illustrated in example 330 of FIG. 3B.

FIG. 3C illustrates an example 350 of the user switching from a first floor depiction of the department store indoor facility map interface 310 to a second floor depiction of the department store indoor facility map interface 310a based upon the user invoking a switch floors interface 252. The user may drag and drop the air freshener device marker element 314 onto the second floor depiction of the department store indoor facility map interface 310a such that the device placement component 302 may place 354 a first air freshener device marker element 314a at an initial position corresponding to a second floor kitchen section of the department store. In this way, the user may place hygiene device markers within the map interface 306.

Figure 4:
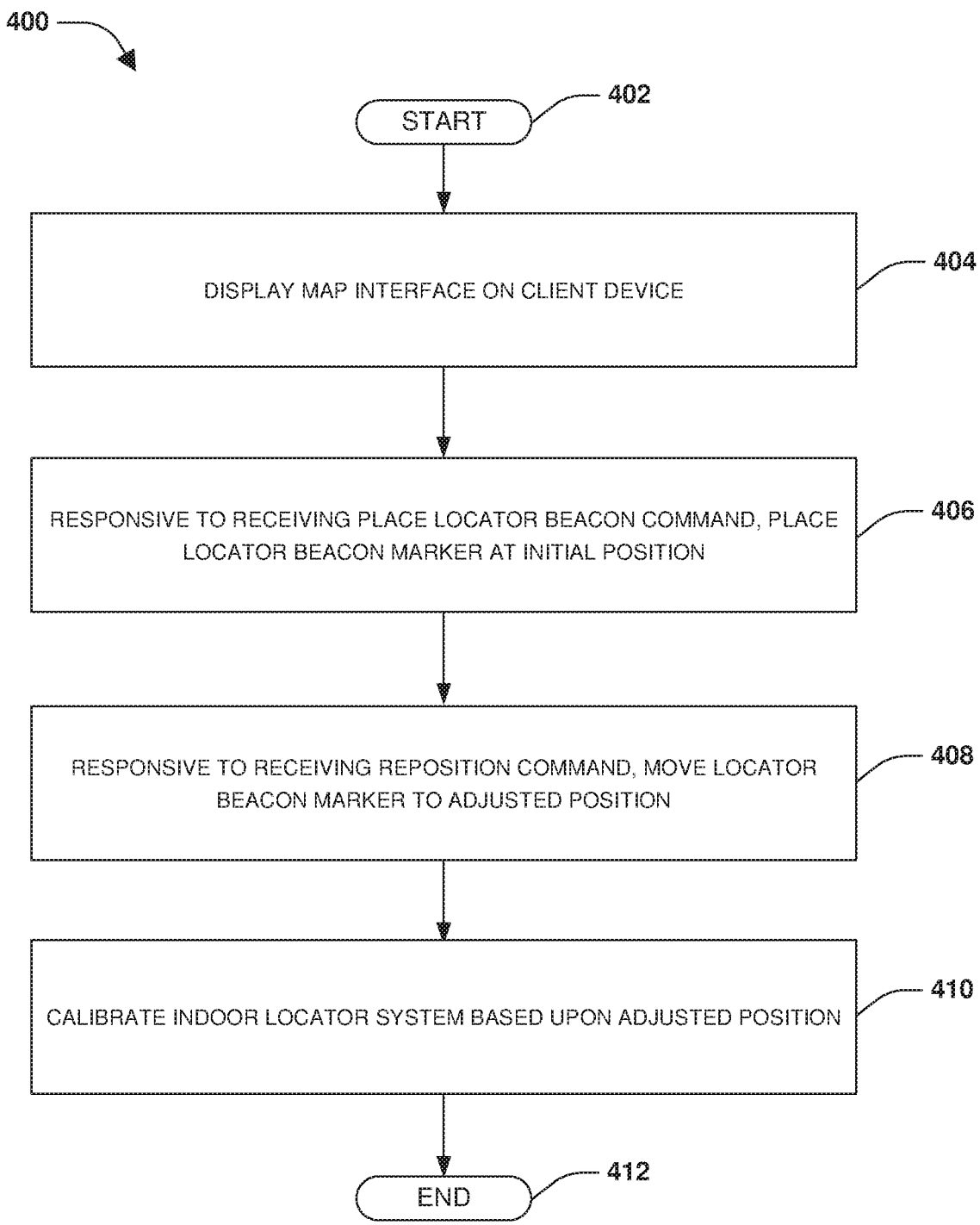
FIG. 4 is a flow diagram illustrating an example method of indoor locator system installation.

An embodiment of indoor locator system installation is illustrated by an exemplary method 400 of FIG. 4. At 402, the method starts. In an example, a user may be installing an indoor locator system within a building. The indoor locator system may utilize one or more locator beacons, such as Bluetooth locator beacons or any other location tracking/identification technology, for identify positions of objects within the building. Because physical placement of locator beacons may not accurately match coordinates used by the indoor locator system to identify positions of the locator beacons, the indoor locator system may be calibrated based upon placement of locator beacon markers within a map interface.

At 404, a map interface, depicting the building, may be displayed on a client device, such as a tablet device utilized by a user that is installing the indoor locator system within the building. At 406, responsive to receiving a place locator beacon command (e.g., the user may select a place locator beacon button of the map interface), a locator beacon marker may be placed on the map interface at an initial position. The locator beacon marker may represent a locator beacon that the user is placing within the building at a current location of the user. The locator beacon marker may be placed at the initial position based upon initial GPS coordinates of the tablet device. Because the initial GPS coordinates may be relatively inaccurate due to the tablet device being within the building, the user may reposition the locator beacon marker within the map interface to a relatively more accurate position. At 408, responsive to receiving a reposition command for the locator beacon marker, the locator beacon marker may be moved from the initial position to an adjusted position (e.g., the user may drag and drop the locator beacon marker from a center position within a room to an eastern wall of the room). In an example, the initial GPS coordinates may be updated based upon the adjusted position to create updated GPS coordinates that may be relatively more accurate than the initial GPS coordinates and thus a GPS locating system may be trained to utilize more accurate GPS coordinates.

At 410, the indoor locator system may be calibrated based upon the adjusted position. For example, the indoor locator system may be calibrated to associate the adjusted position (e.g., coordinates of the adjusted position) with the locator beacon, as opposed to the initial position. In an example where multiple locator beacons are placed within the building and are represented by locator beacon markers positioned within the map interface, a triangulation between a plurality of locator beacons of the indoor locator system may be configured based upon adjusted positions of the locator beacon markers (e.g., and/or initial positions of locator beacon markers that are not repositioned by the user).

The indoor locator system may be utilized to identify locations of users, such as a shopper within a shopping mall inside the building. Locational information of the location may be evaluated to identify a user context, such as the user walking into a shoe store. In an example, a recommendation, such as a coupon for the shoe store, may be provided to the user based upon the user context. In another example, the user context may be provided to a content provider such as an online shopping website that may provide a promotional message to the user for discounted shoes. At 412, the method ends.

Figure 5A:
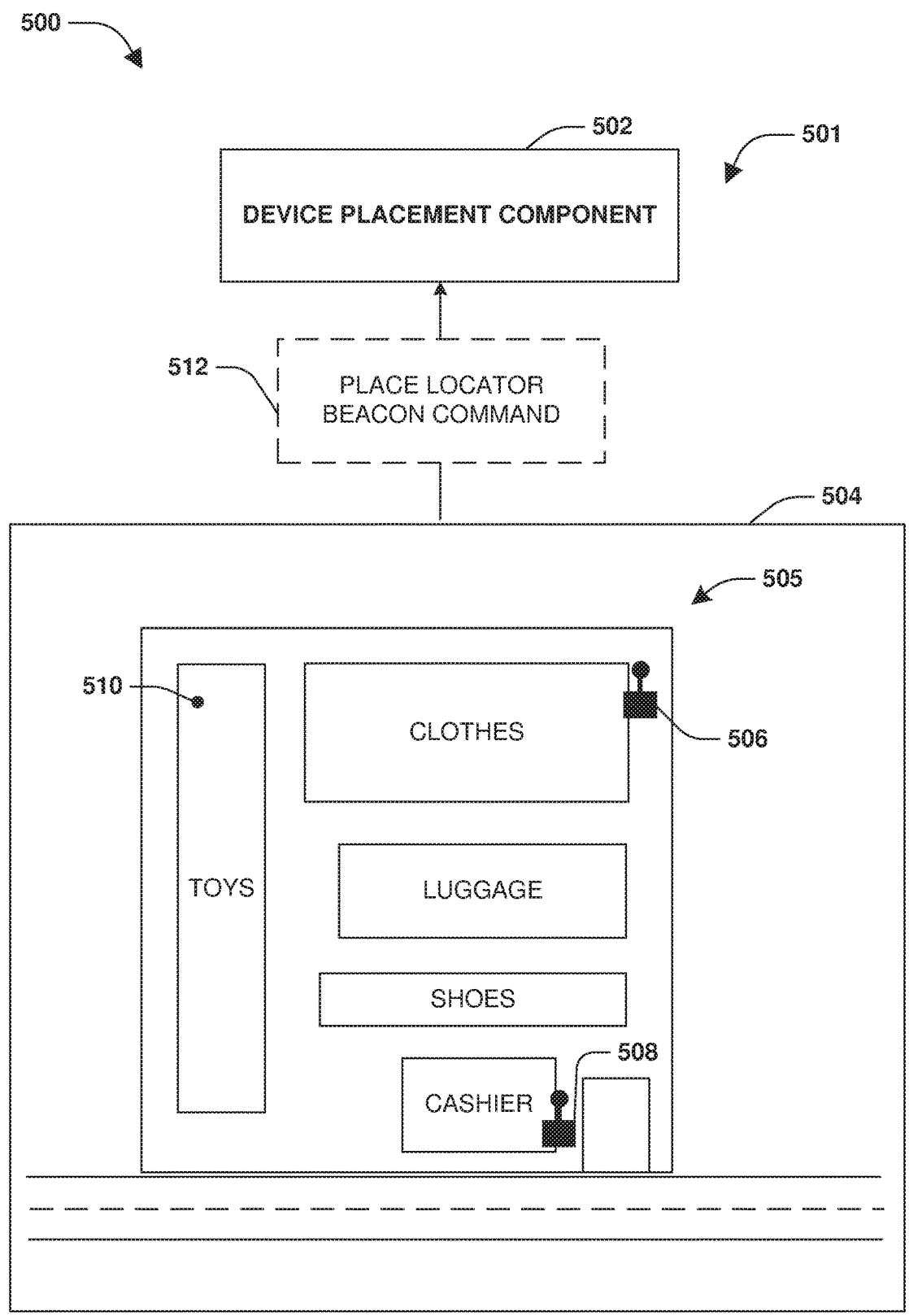
FIG. 5A is a component block diagram illustrating an example system for indoor locator system installation.

FIGS. 5A-5D illustrate examples of a system 501, comprising a device placement component 502, for indoor locator system installation. The device placement component 502 may display a map interface 504 on a client device, such as a user that is installing an indoor locator system within a department store building. FIG. 5A illustrates an example 500 of the map interface 504 comprising a department store map interface 505 depicting the department store building. The user may have installed a first locator beacon, represented by a first locator beacon marker 506 within the department store map interface 505, near a clothing department. The user may have installed a second locator beacon, represented by a second locator beacon marker 508 within the department store map interface 505, by a cashier section of the department store building. The device placement component 502 may receive a place locator beacon command 512 for a toy department.

Figure 5B:
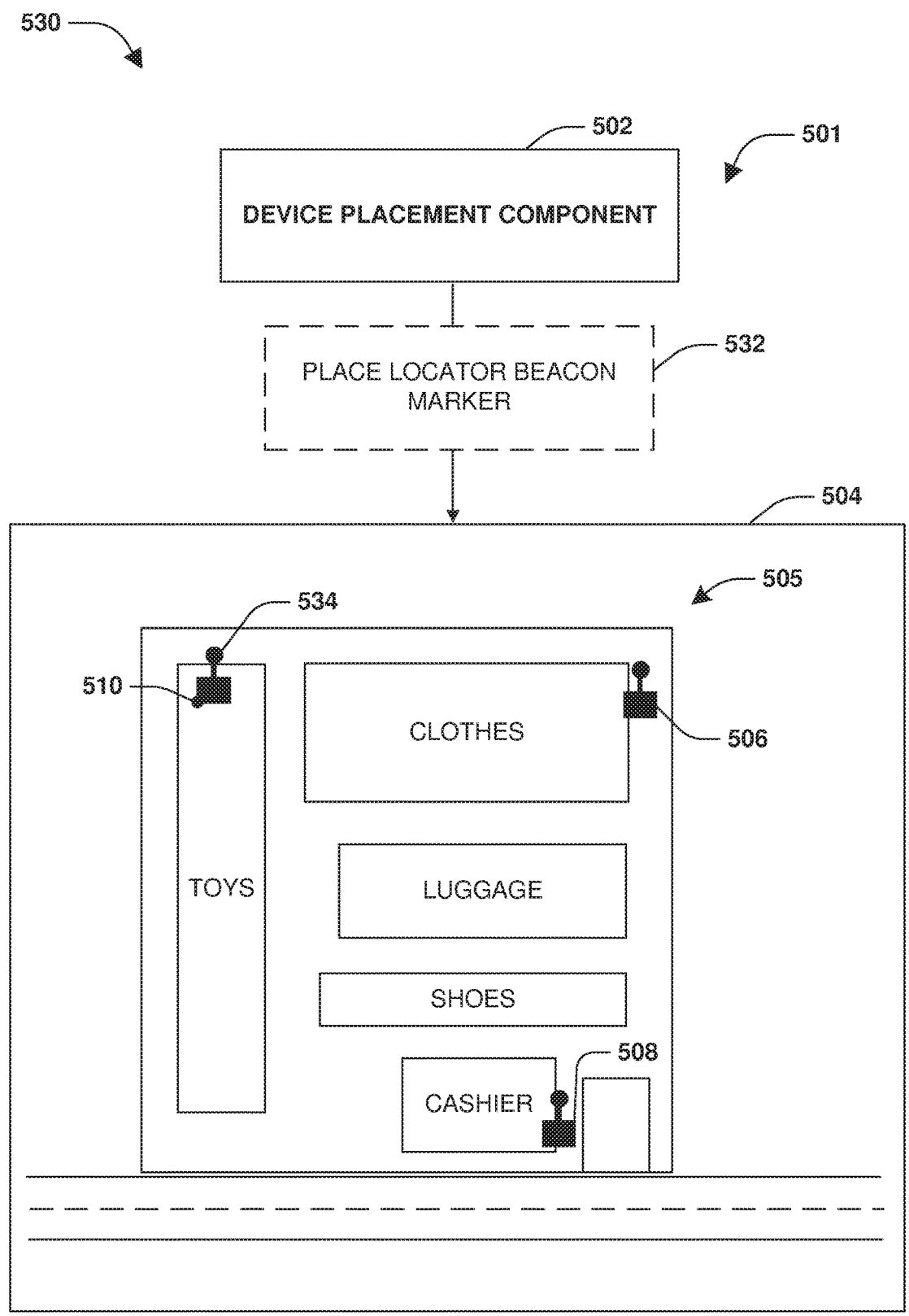
FIG. 5B is a component block diagram illustrating an example system for indoor locator system installation, where a locator beacon marker is placed on a map interface.

FIG. 5B illustrates an example 530 of the device placement component 502 placing 532 a third locator beacon marker 534 at an initial position 510 within the toy department based upon the place locator beacon command 512. The initial position 510 may be identified based upon initial GPS coordinates of the client device, which may be relatively inaccurate because the client device may be located within the department store building.

Figure 5C:
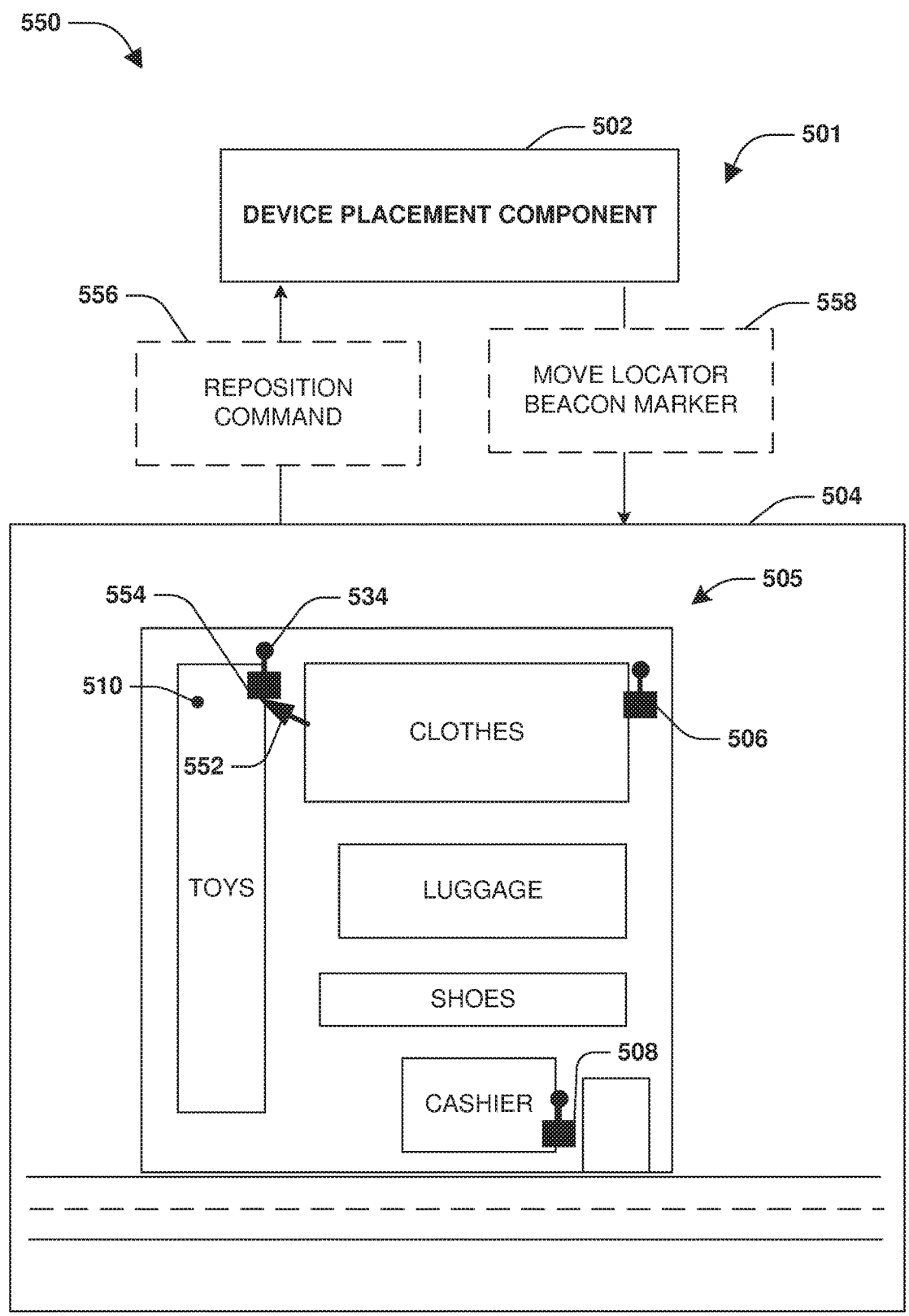
FIG. 5C is a component block diagram illustrating an example system for indoor locator system installation, where a locator beacon marker is repositioned within a map interface.

FIG. 5C illustrates an example 550 of the user repositioning the third locator beacon marker 534. For example, the user may drag and drop the third locator beacon marker 534 to a new location using a cursor 552, which may be detected by the device placement component 502 as a reposition command 556. Accordingly, the device placement component 502 may move 558 the third locator beacon marker 534 from the initial position 510 to an adjusted position 554. The device placement component 502 may calibrate the indoor locator system (e.g., indoor locator system 574 illustrated in FIG. 5D), such as by configuring a triangulation between the first locator beacon represented by the first locator beacon marker 506, the second locator beacon represented by the second locator beacon marker 508, and the third locator beacon represented by the third locator beacon marker 534.

Figure 5D:
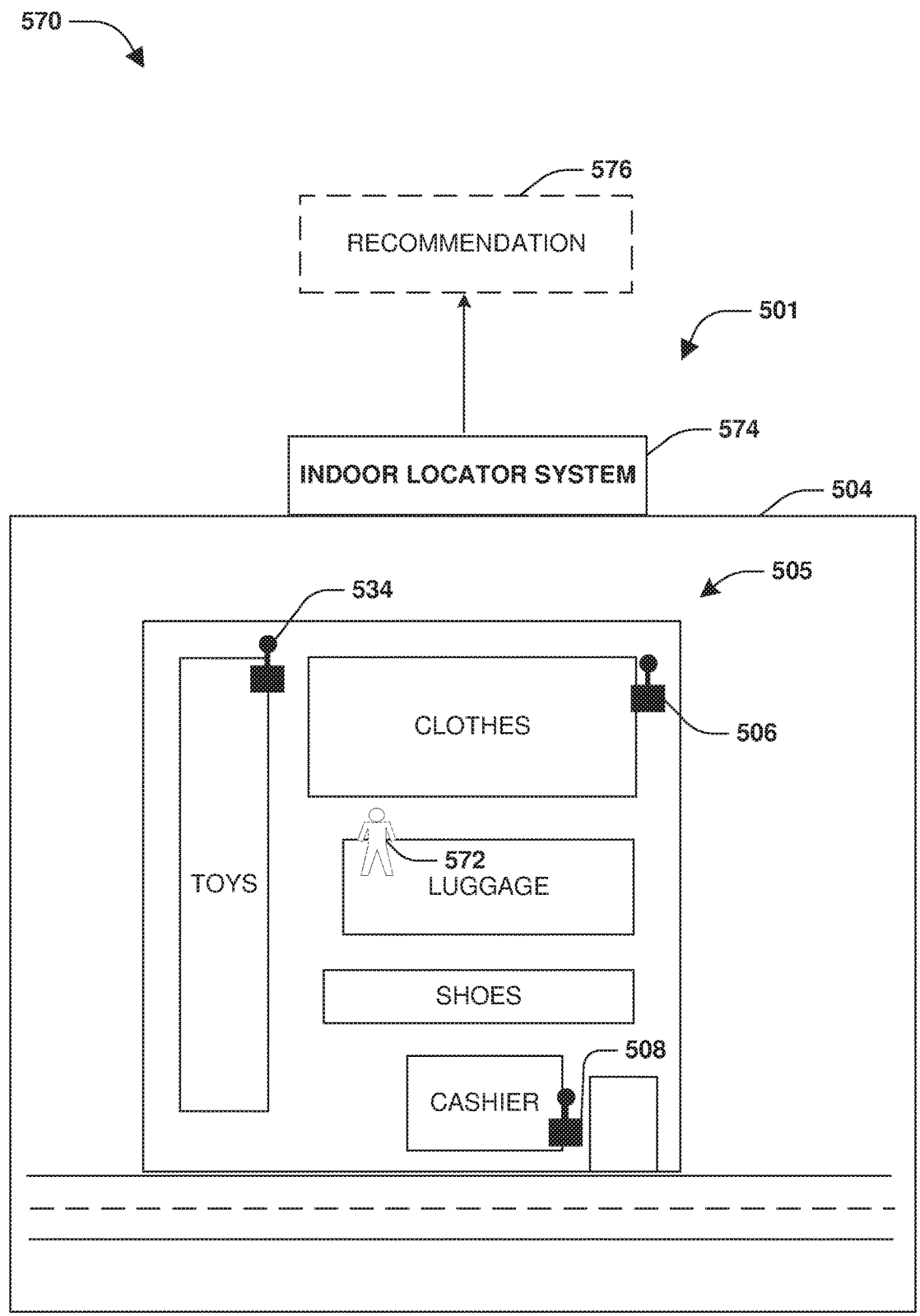
FIG. 5D is a component block diagram illustrating an example system for indoor locator system installation, where a recommendation is provided.

FIG. 5D illustrates an example 570 of providing a recommendation 576. For example, a shopper may walk into a luggage department of the department store building for which the indoor locator system 574 is installed. The indoor locator system 574 may identify a location of the shopper as the luggage department based upon information provided by the first locator beacon represented by the first locator beacon marker 506, the second locator beacon represented by the second locator beacon marker 508, and the third locator beacon represented by the third locator beacon marker 534. The indoor locator system 574 may evaluate locational information of the location (e.g., a current inventory of luggage sold by the luggage department, which may be obtained from an inventory system of the department store or extracted from a department store website) to identify a user context, such as the user having an interest in purchasing large luggage. Accordingly, the indoor locator system 574 may provide a recommendation 576, such as a push notification of a large luggage coupon, to a client device of the shopper 572.

Figure 6A:
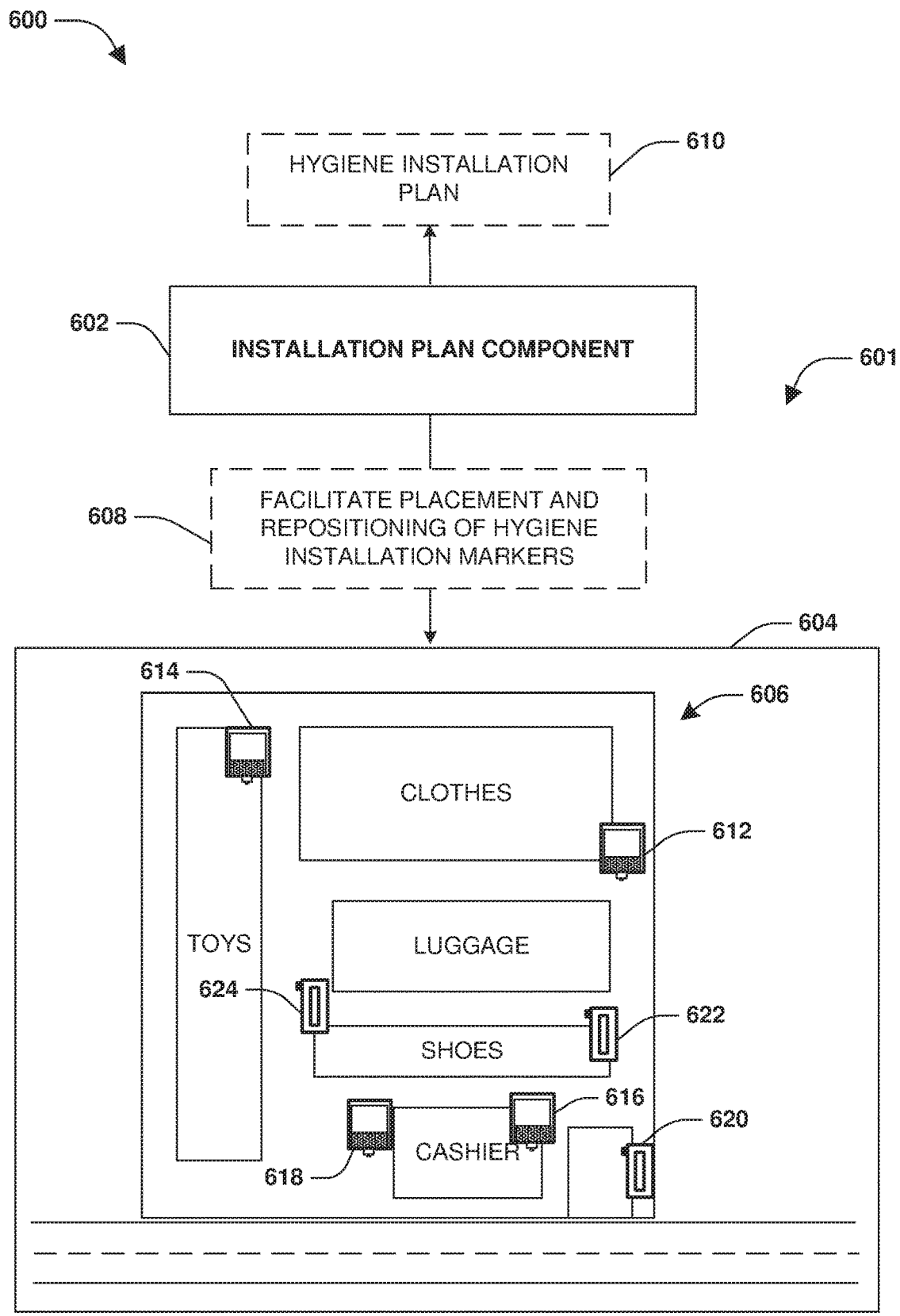
FIG. 6A is a component block diagram illustrating an example system for creating a hygiene installation plan for hygiene devices.
Figure 6B:
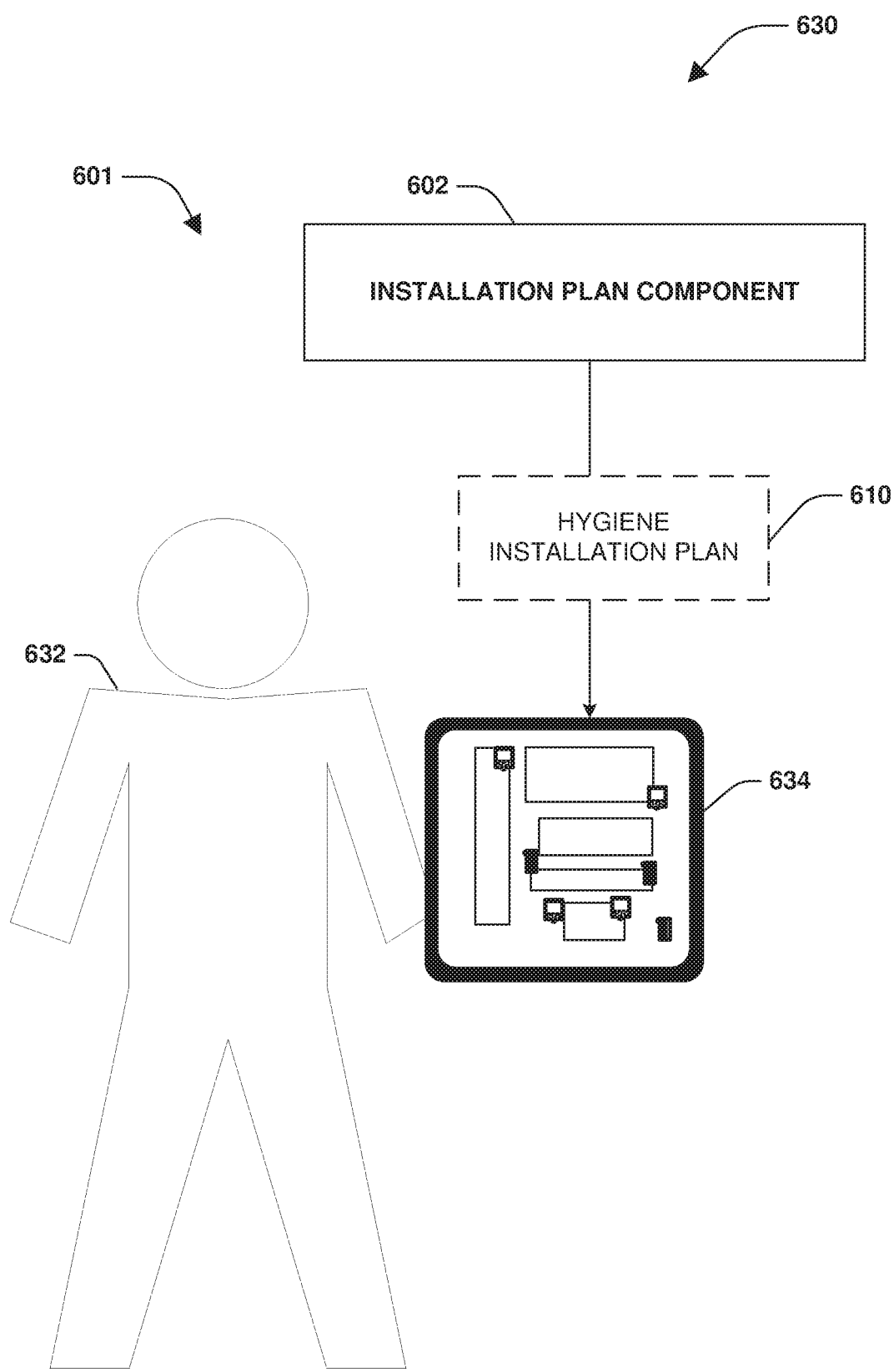
FIG. 6B is a component block diagram illustrating an example system for utilizing a hygiene installation plan for hygiene devices.

FIGS. 6A and 6B illustrate examples of a system 601, comprising an installation plan component 602, for creating and/or utilizing a hygiene installation plan 610 for installing hygiene devices. FIG. 6A illustrates an example 600 of the installation plan component 602 displaying a map interface 604 to a user. The installation plan component 602 may identify an indoor facility map interface 606 populated within the map interface 604. For example, the indoor facility map interface 606 may correspond to an indoor facility such as a department store comprising a toy department, a clothing department, a luggage department, a shoe department, a cashier section, a front door, etc.

The installation plan component 602 may facilitate 608 placement and/or repositioning of hygiene installation markers on the indoor facility map interface 606 by the user. For example, responsive to receiving a place hygiene installation marker command (e.g., the user may drag and drop a sanitizer device marker element from a device marker interface onto the cashier section of the indoor facility map interface 606), a hygiene installation marker may be placed on the indoor facility map interface 606 at an initial position. The hygiene installation marker may be customized to specify a hygiene device type of a hygiene device that is to be installed within the indoor facility (e.g., a Model X sanitizer device), programming for the hygiene device (e.g., an amount of sanitizer to dispense, network/communication configuration, types of service alerts to provide over a network, a battery level threshold used to trigger a low battery alert, etc.), and/or other installation instructions (e.g., an installation wall height, a dispenser housing color, a power source, etc.). Because the hygiene installation marker may be placed at the initial position based upon relatively inaccurate GPS coordinates a user device of the user, the user may reposition the hygiene installation marker utilizing a reposition command (e.g., a drag and drop command) Responsive to receiving the reposition command, the hygiene installation marker may be moved from the initial position to an adjusted position. The hygiene installation marker, at the adjusted position (e.g., or at the initial position if the user does not reposition the hygiene installation marker), may be included within the hygiene installation plan 610.

In an example, the user may place and/or reposition a first soap dispenser installation marker 614 indicating that a first soap dispenser is to be installed within the toy department. The user may place and/or reposition a second soap dispenser installation marker 612 indicating that a second soap dispenser is to be installed within the clothing department. The user may place and/or reposition a first sanitizer dispenser installation marker 616 indicating that a first sanitizer dispenser is to be installed near the cashier section. The user may place and/or reposition a second sanitizer dispenser installation marker 618 indicating that a second sanitizer dispenser is to be installed near the cashier section. The user may place and/or reposition a first air freshener installation marker 622 indicating that a first air freshener is to be installed near the shoe department. The user may place and/or reposition a second air freshener installation marker 624 indicating that a second air freshener is to be installed near the shoe department. The user may place and/or reposition a third air freshener installation marker 620 indicating that a third air freshener is to be installed near the front door. The hygiene installation markers may be customized with installation instructions, hygiene device model types, hygiene device programming instructions, and/or other information. The installation markers may be included within the hygiene installation plan 610. In this way, the installation plan component 602 creates the hygiene installation plan 610 for utilization during installation of hygiene devices within the indoor facility.

FIG. 6B illustrates an example 630 of the installation plan component 602 providing the hygiene installation plan 610 to a client device 634 of an installer user 632 that is to install hygiene devices within the indoor facility. The hygiene installation plan 610 may comprise textual, visual, and/or video instructions on what hygiene devices to install and where to install the hygiene devices. In an example, the hygiene installation plan may specify coordinates of where to install a hygiene device, a model of the hygiene device, and/or any other instructions such as how to program the hygiene device (e.g., how much sanitizer to dispense per dispense event, network configuration data, etc.). In another example, the hygiene installation plan 610 may comprise the indoor facility map interface populated with the hygiene installation markers. The installer user 632 may interact with a hygiene installation marker in order to view installation instructions for that hygiene installation marker.

Figure 7:
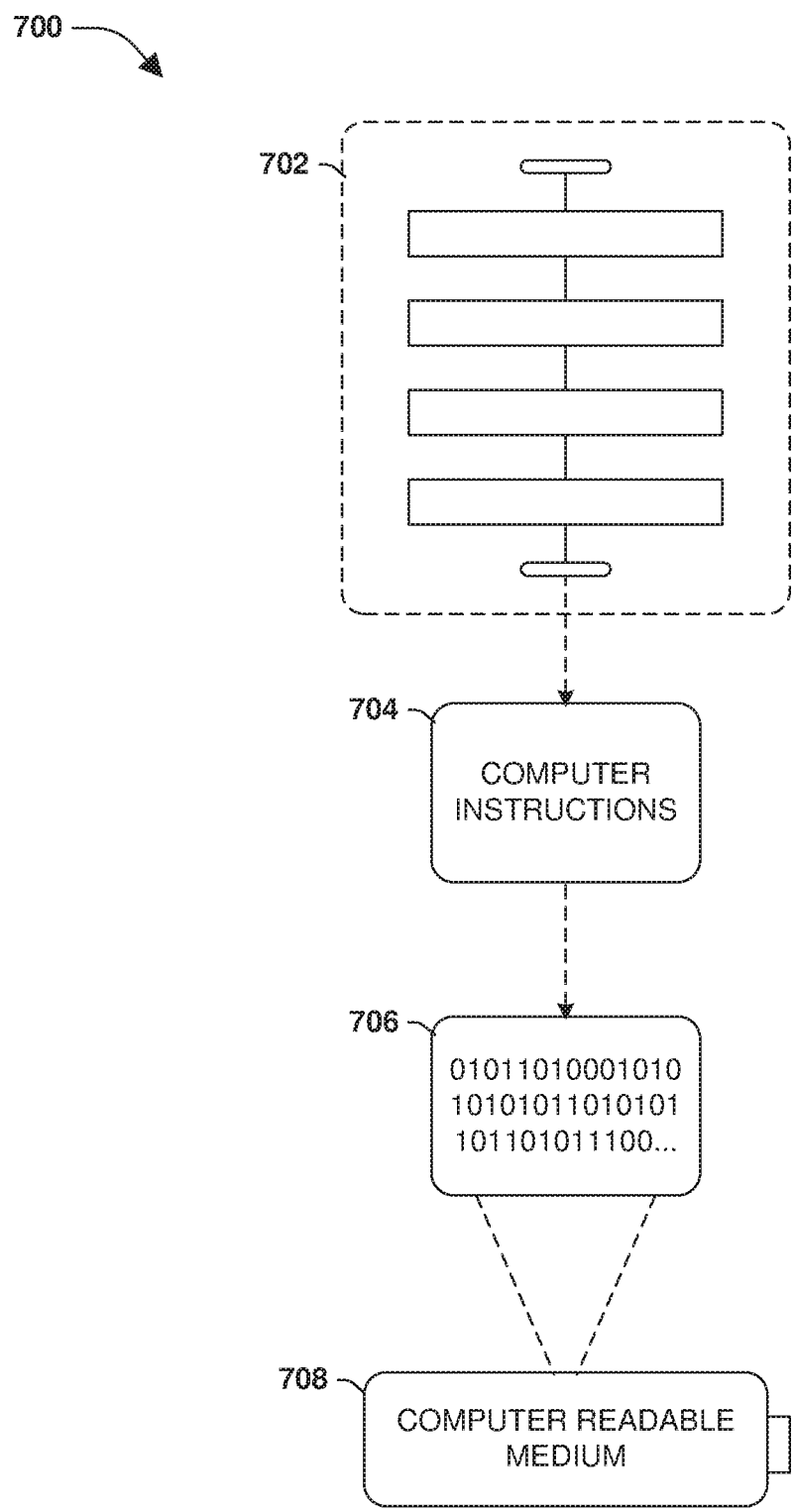
FIG. 7 is an illustration of an example computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1 and/or the exemplary method 400 of FIG. 4, for example. In some embodiments, the processor-executable instructions 704 are configured to implement a system, such as at least some of the exemplary system 201 of FIGS. 2A-2C, at least some of the exemplary system 301 of FIGS. 3A-3C, at least some of the exemplary system 501 of FIGS. 5A-5D, and/or at least some of the exemplary system 601 of FIGS. 6A-6B, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
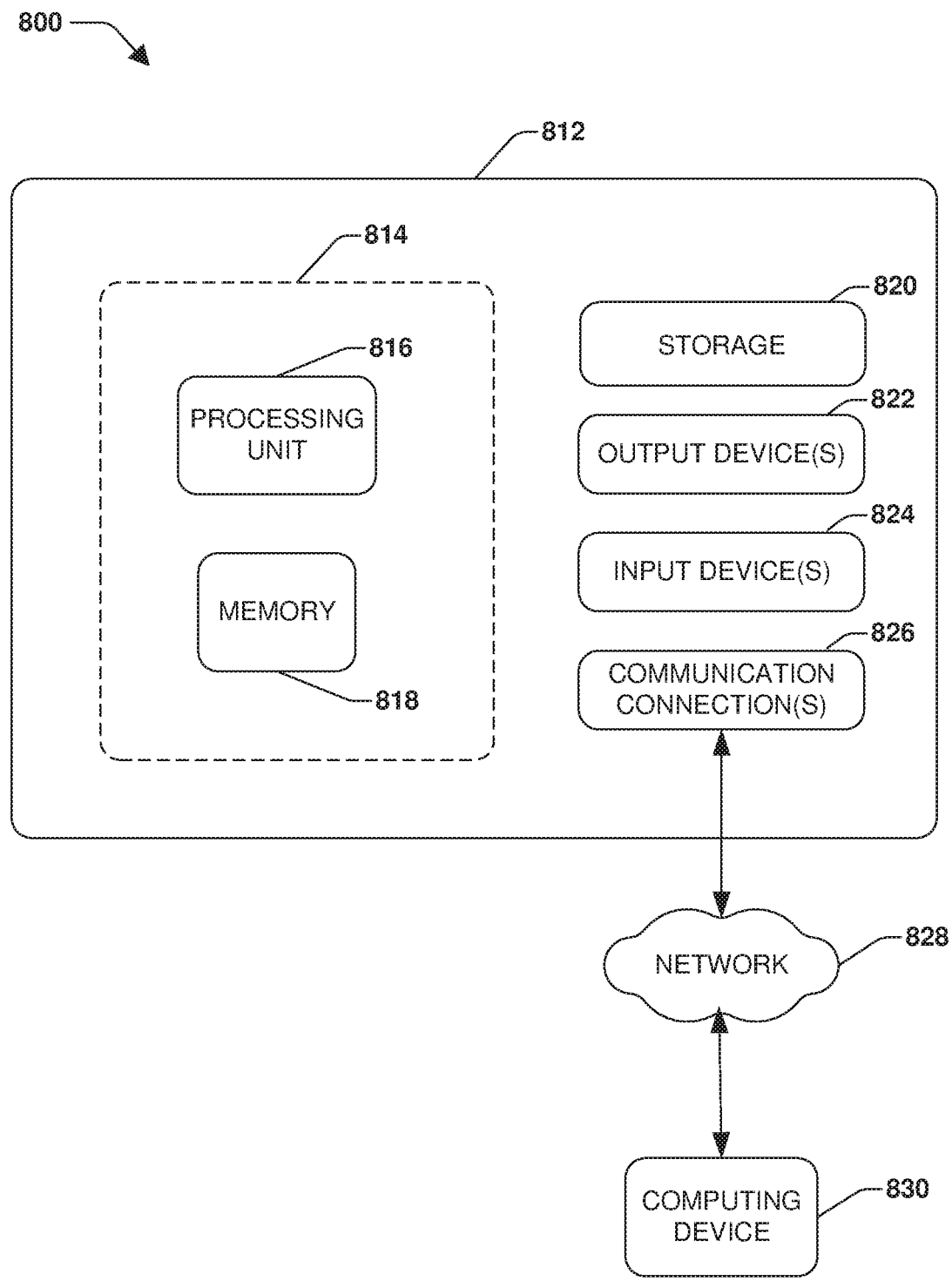
FIG. 8 illustrates an example computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for hygiene device marker placement on a map interface, comprising:

displaying a map interface to a user;

responsive to receiving an initiate marker creation command, displaying a create marker interface comprising a hygiene device type specification interface;

receiving a create marker command through the create marker interface;

placing a hygiene device marker on the map interface at an initial position responsive to receiving the create marker command, the hygiene device marker representing a hygiene device; and responsive to receiving a reposition command for the hygiene device marker, moving the hygiene device marker from the initial position to an adjusted position while a position of the hygiene device remains static.

2. The method of claim 1, comprising:

adjusting initial global positioning system (GPS) information, used to identify the initial position, based upon the adjusted position to create updated GPS information.

3. The method of claim 1, the create marker interface comprising at least one of a building floor designation interface or a location name specification interface.

4. The method of claim 1, the placing a hygiene device marker comprising:
identifying locational information of a user device hosting the map interface; and
selecting the initial position based upon the locational information.

5. The method of claim 1, comprising:
displaying a service alert notification for the hygiene device through the hygiene device marker.

6. The method of claim 1, comprising:
responsive to a second user successfully authenticating with a map content provider that provides the map interface to client devices, applying a visible attribute to the hygiene device marker so that the hygiene device marker is visible to the second user; and
responsive to the second user unsuccessfully authenticating with the map content provider, applying a hidden attribute to the hygiene device marker so that the hygiene device marker is not visible to the second user.

7. The method of claim 1, comprising identifying an indoor facility map interface populated within the map interface, and the placing a hygiene device marker on the map interface comprising placing the hygiene device marker within the indoor facility map interface.

8. The method of claim 1, wherein the hygiene device type specification interface comprises a plurality of hygiene device icons, a first hygiene device icon of the plurality of hygiene device icons corresponding to a first type of hygiene device and a second hygiene device icon of the plurality of hygiene device icons corresponding to a second type of hygiene device.

9. The method of claim 1, comprising:
displaying a share interface for the hygiene device marker; and
responsive to receiving a share command through the share interface, sharing the hygiene device marker and one or more comments about with the hygiene device with at least one of a second user or a map content provider that provides the map interface to client devices.

10. The method of claim 1, the placing a hygiene device marker comprising:
creating an entry within a hygiene device tracking database, the entry correlating the hygiene device, represented by the hygiene device marker, with coordinates of the initial position and a hygiene device type of the hygiene device.

11. The method of claim 10, the moving the hygiene device marker comprising:
updating the coordinates within the entry to adjusted coordinates of the adjusted position.

12. The method of claim 1, wherein the hygiene device marker is associated with an installation instruction and the method comprises:
responsive to receiving a selection of the hygiene device marker, displaying the installation instruction.

13. The method of claim 1, the initiate marker creation command comprising at least one of a gesture command, a voice command, a click command, or a map selection command.

14. The method of claim 1, comprising:
displaying a device marker interface populated with one or more device marker elements, a device marker element corresponding to a hygiene device type; and
facilitating a drag and drop command of the device marker element from the device marker interface onto the map interface.

15. A method for indoor locator system installation, comprising:
displaying a map interface on a client device;
responsive to receiving a place locator beacon command, placing a locator beacon marker representative of a locator beacon on the map interface at an initial position;
responsive to receiving a reposition command for the locator beacon marker, moving the locator beacon marker from the initial position to an adjusted position while a position of the locator beacon remains static; and
calibrating an indoor locator system based upon the adjusted position.

16. The method of claim 15, the calibrating comprising:
configuring a triangulation between a plurality of locator beacons of the indoor locator system based upon at least one of initial positions or adjusted positions of locator beacon markers representing the plurality of locator beacons.

17. The method of claim 15, comprising:
utilizing the indoor locator system to identify a location of a user;
evaluating locational information of the location to identify a user context; and
providing at least one of:
the user context to a content provider; or
a recommendation to the user based upon the user context.

18. A system for creating a hygiene installation plan for hygiene devices, comprising:
an installation plan component configured to:
display a map interface to a user;
identify an indoor facility map interface populated within the map interface, the indoor facility map interface corresponding to an indoor facility;
facilitate initial placement and repositioning of hygiene installation markers on the indoor facility map interface by the user; and
create a hygiene installation plan for hygiene devices within the indoor facility based upon the hygiene installation markers.

19. The system of claim 18, the installation plan component configured to:
provide the hygiene installation plan to a client device of an installer user, the hygiene installation plan comprising the indoor facility map interface populated with the hygiene installation markers.

20. The system of claim 18, the installation plan component configured to:
responsive to receiving a place hygiene installation marker command, place a hygiene installation marker on the indoor facility map interface at an initial position;
responsive to receiving a reposition command for the hygiene installation marker, move the hygiene installation marker from the initial position to an adjusted position; and
including the hygiene installation marker, at the adjusted position, within the hygiene installation plan.

* * * * *